March 21, 1939.    G. T. COOKE    2,151,316
COTTER PIN LOCKING DEVICE
Filed March 12, 1938
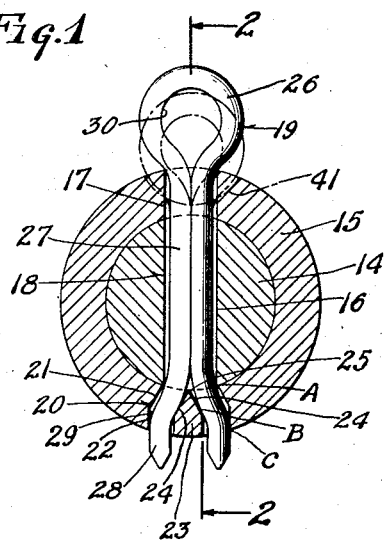
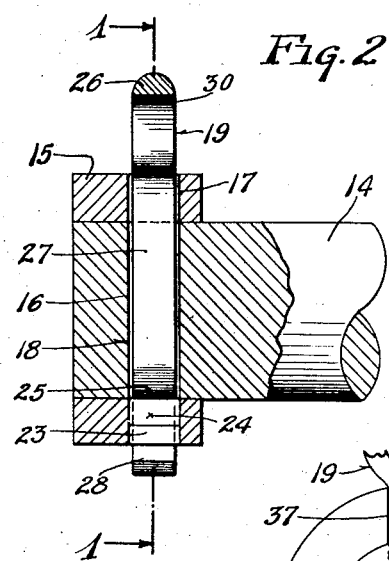
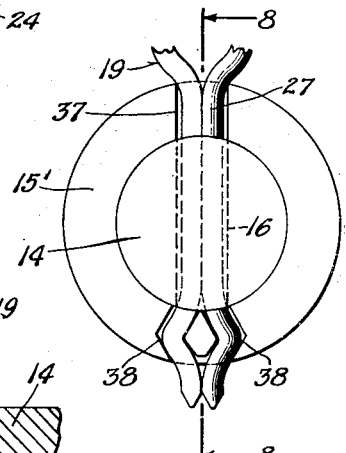
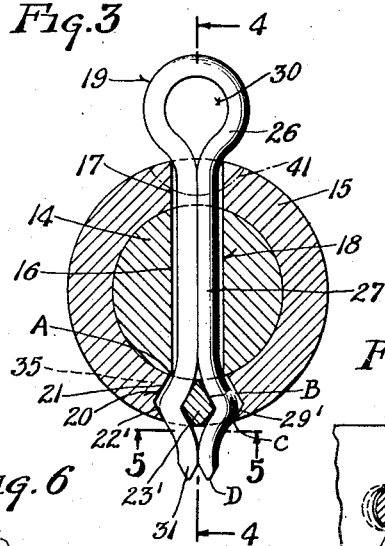
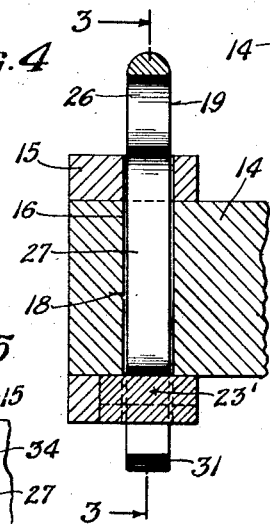
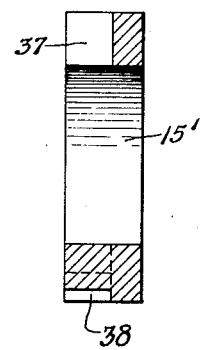
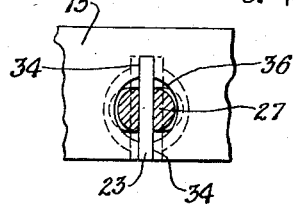
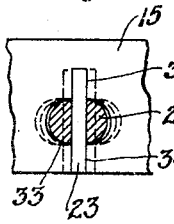
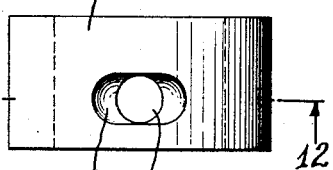
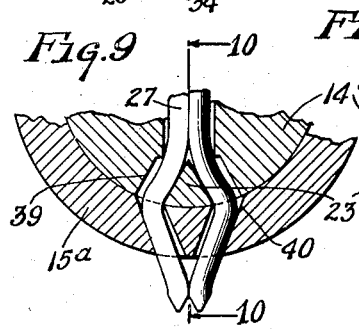
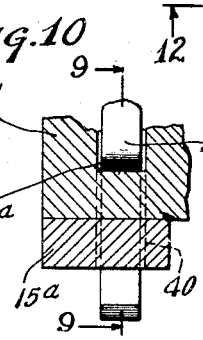
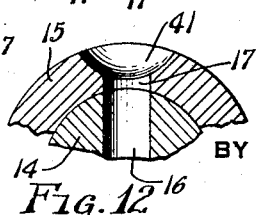
INVENTOR
GEORGE T. COOKE
BY
William T. Feyrer
ATTORNEY Patented Mar. 21, 1939

2,151,316

UNITED STATES PATENT OFFICE 2,151,316

COTTER PIN LOCKING DEVICE

George T. Cooke, Norwalk, Conn., assignor to American Railway Products Co., Inc., Darien, Conn., a corporation of New York Application March 12, 1938, Serial No. 195,448

11 Claims. (Cl. 85—7)

The present invention relates to new and useful improvements in cotter pin locking devices wherein a cotter pin is automatically spread and locked in place.

The ordinary method of locking a cotter pin consists in spreading apart the free ends of the arms, which project from the bore in which the cotter pin is seated. Particularly if such spreading is performed manually by means of a hammer or similar tool it occurs easily that the projecting ends are broken off, thus requiring a replacement of the cotter pin.

This method has the further disadvantage that the projecting ends usually are bent at a large angle relative to each other so that, if for any reasons it is desirable that the cotter pin be removed, it is first necessary that the ends be bent toward each other before such removal can be effected. Such repeated bending is, however, injurious to the cotter pin and requires unnecessary time and effort.

It is an object of the present invention to provide a locking device which avoids the above-mentioned disadvantages and whereby the cotter pin is locked more securely than by other types of locking means heretofore proposed.

Another object is the provision of a locking device whereby the cotter pin is securely held in place but, if desirable or necessary, the cotter pin can be manually removed by a simple operation and without destroying the same.

A feature of the present invention is the provision in a body of an entrance hole for a cotter pin, at least one outlet bore coextensive with the entrance hole but having walls converging toward the outside of said body, and a wedge-shaped portion within the outlet bore and in line with the entrance hole so that if a cotter pin is inserted into the entrance hole, its arms are spread apart by the wedge-shaped portion, and after such spreading, the arms are automatically bent toward each other by the converging walls of the outlet bore. Thus, a double bend is provided in each arm; the arms grip around the wedge-shaped portion and each arm engages the body itself and the wedge-like portion in at least two or three points thereby preventing any possible accidental removal, and the free ends of the arms are brought in close proximity of each other, so that, if it is desired that the cotter pin be removed, the two free ends can be struck simultaneously with a hammer.

Another feature of the present invention is the provision of an entrance hole for a cotter pin in one side of the wall of a sleeve, a pair of diverging bores for spreading the arms of the cotter pin and a pair of substantially parallel bores in the wall of the sleeve opposite said entrance hole. By means of this structure a double bend may be provided in each arm of the cotter pin and the free ends of the arms extend in spaced but substantially parallel relation.

According to another feature of the invention, the second pair of bores may converge toward the outer surface of the body so that, upon an insertion of a cotter pin, the arms thereof are first bent outwardly and then toward each other to grip around the portion intermediate the bores. If according to this feature the arms of the cotter pin are of sufficient length, the ends thereof are automatically forced against each other and thereby enfold the intermediate portion completely. By thus forcing the ends against each other, opposed directional forces are produced whereby the bent portions of the arms in the respective bores are forced outwardly of each other so as to press against the opposed outer surfaces of the bores and produce thereby an additional locking effect.

Still another feature of the invention resides in providing in the wall of a sleeve at one face thereof a groove or slot of a width to accommodate a cotter pin, and substantially diametrically opposite said slot, a pair of narrower grooves each of angular extent so as to leave a wedge-shaped projection therebetween. If said sleeve is placed over a shaft, rod or the like, in which a bore is provided and the grooves in the sleeve are placed in alignment with the bore, a cotter pin may be inserted into the wider groove and the bore and driven into the angular grooves to be locked thereby in a manner similarly to that described above.

According to another feature of the invention only the converging walls or bores may be located in the sleeve surrounding a shaft or rod, while the diverging walls for spreading the cotter pin may be located in the shaft itself.

Other objects, features and advantages will appear from the following detailed description and the drawing, in which:

Figure 1 is a cross-sectional view taken along line 1—1 of Fig. 2.

Fig. 2 is a cross-sectional view taken along line 2—2 of Fig. 1.

Fig. 3 is a cross-sectional view taken along line 3—3 of Fig. 4, and shows a modification of the invention.

Fig. 4 is a cross-sectional view taken along line 4—4 of Fig. 3.

Fig. 5 is a section taken along line 5—5 of Fig. 3.

Fig. 6 is a section similar to Fig. 5 but showing another modification of the invention.

Fig. 7 is a fractional end view of a further modification.

Fig. 8 is a section along line 8—8 of Fig. 7.

Fig. 9 is a fractional section of still another modification taken along line 9—9 of Fig. 10.

Fig. 10 is a fractional section taken along line 10—10 of Fig. 9.

Fig. 11 is a plan view of a modified detail of the present invention.

Fig. 12 is a section taken along line 12—12 of Fig. 11.

Before describing the present improvements and mode of operation thereof in detail it should be understood that the invention is not limited to the details of construction and arrangement of parts shown in the accompanying drawing, which is merely illustrative of the present preferred embodiments, since the invention is capable of other embodiments, and the phraseology employed is for the purpose of description and not of limitation.

As shown particularly by Figs. 1 to 4 a rod or shaft 14 and a sleeve 15 surrounding the shaft are provided with coaxial holes 16 and 17 together forming a main passage 18 for a cotter pin 19. A pair of bores 20 of angular extent are provided in the opposite wall of sleeve 15 coextensive with the main passage 18 and include inner portions 21 and outer portions 22. The inner portions 21 diverge outwardly from hole 16 in shaft 14 so as to form a wedge-like portion 23 therebetween with diverging walls 24 and a dividing or spreading edge 25, while the outer portions 22 of bores 20 are disposed at an angle relative to the inner portions 21.

A cotter pin having a head 26 and arms 27 is inserted in the passage 18 until the outer ends 28 of arms 27 which preferably are rounded or bevelled come to rest on the edge 25 of the wedge-like portion 23. When a forceful blow is now exerted upon the head 26, the arms are spread apart by the wedge 23, enter into the diverging portions 21 of bores 20 and when the rounded or bevelled ends 28 of the arms contact with the outer walls 29 of the portions 22 of bores 20 they are bent in a direction toward each other.

According to the embodiment of the invention shown in Fig. 1, the outer portions 22 of bores 20 are substantially parallel or converge slightly toward each other so that the lower ends of arms 27 are disposed in substantially parallel relation when the cotter pin has been fully inserted. As indicated in Fig. 1, each of the arms 27 has three points of contact with the walls of bore 20, that is points "A" and "C" at the inner and outer edges of the bores and point "B" at the diverging walls of the wedge 23. Thus, by first spreading the arms 20 of the cotter pin and then bending them toward each other so as to be parallel, the cotter pin is locked securely to the sleeve 15 against any sliding movement. If it is desired or necessary that the cotter pin be removed, the two ends 28 thereof can be struck simultaneously with a hammer until they are flush with the outer surface of sleeve 15 whereupon a suitable hooked bar or rod may be inserted into the eye 30 of the head 26 to withdraw the cotter pin completely from the sleeve 15.

According to the modification of the invention shown in Fig. 3, the bores 20 consist of inner diverging portions 21 and outer converging portions 22' forming a wedge 23' therebetween of substantially diamond shape. If a cotter pin is inserted into the passage 18 of this modification, the arms 27 are also first spread as in the form according to Fig. 1, but thereafter they are directed toward each other by the converging walls 29'.

Thus, the outer ends of arms 27 enclose the wedge 23' and are in a strong gripping or bighting engagement with the wedge and the sleeve proper.

If a still stronger gripping action of the cotter pin on the sleeve is desired, a pin with relatively long arms 31 may be used which extend out of the bores 20 and which, when the cotter pin is completely inserted into the passage 18, are forced against each other by the converging walls 29' of the bores 20. By thus forcing the two arms 27 against each other, opposed directional forces are produced which tend to spread the bent portions 31 of the arms against the opposed outer surfaces 29' thereof so as to increase the locking action of the cotter pin on the sleeve 15 to a still greater extent. As clearly shown, for example in Fig. 3, the wedge 23' is then completely enclosed by the bent arms 27 of the cotter pin which are held in binding engagement with the sleeve proper, the wedge 23' and with each other at least at the points "A", "B", "C" and "D". The cotter pin is thus locked against any possible accidental removal and it requires considerable force to remove the same intentionally. Such intentional removal may be performed in the same manner as described relative to Fig. 1.

The locking device according to my present invention may be manufactured in various ways. The sleeve 15 with bores 20 for example in Figs. 1 and 2, or the sleeve and wedge may be made separately. In the latter case, as shown particularly in Fig. 5, an elongated slot 33 with rounded ends and a cross-section shown in full lines in Fig. 3 may be formed in sleeve 15 by any suitable method. Grooves or cutout portions 34 may be provided at opposite sides of slot 33 into which the wedge 23 is inserted and in which it may be secured by any suitable means, for example by welding. The two bores 20 are thus formed by means of a single slot 33 in which the wedge 23 is inserted which forms the inner walls of the bores.

The shape of bores 20 may also be modified. As indicated in dot-and-dash lines in Fig. 3, the outer walls 35 of the inner portions 21 of the bores may be made parallel to each other. In this case the bighting or gripping engagement of the arms 27 at the point "A" would not be exerted by the edge of the bore in the sleeve but by the outer edges of the hole 16 in the rod or shaft 14. If the bores 20 are formed by a single slot in which a separate wedge 23 is inserted, as shown for example in Fig. 5, the latter modification can be very cheaply produced by a variety of methods. In that event, the slot 33 may have a susbtantially frusto-conical shape in cross-section as can be clearly seen in Fig. 3 and such slot can be made by boring, cutting, grinding, or similar methods, or it may be formed in its final shape by casting.

The manufacture of my new locking device may be still further simplified by forming a round frusto-conical hole 36 in the sleeve as indicated in Fig. 6 and by providing grooves or openings 34 in any suitable manner into which the wedge 23 is inserted and secured as described relative to Fig. 5.

According to another modification shown in Figs. 7 and 8, the sleeve 15' surrounds the cotter pin 19 and the rod or shaft 14 only at one side of the cotter pin and has a groove 37 in its face for receiving and partially surrounding the cotter pin, and a pair of grooves 38 of angular extent in the opposite side for receiving and bending or folding the arms of the cotter pin. Thus, a wedge is formed intermediate the grooves 38 which at one end is either secured to or integral with the sleeve 15'.

In all of the embodiments described heretofore, the means for spreading the arms of the cotter pin and for bending them toward each other were both formed in the sleeve 15. According to still another modification of the invention, shown in Figs. 9 and 10, a pair of diverging bores 39 are provided in the shaft 14' thereby forming a bridge 23a of wedge-like shape, while a pair of converging bores 40 are provided in the sleeve 15a. This modification has the considerable advantage that the respective bores can be made very easily by drilling or the like.

It should be understood that in any of the modifications of the invention shown in Figs. 1 to 10, the wedge 23 may either be integral with the sleeve 15 or formed as a separate element which may be secured to the sleeve either as shown in Figs. 6 and 7 or in any other suitable manner.

It is often found difficult to locate the proper starting hole for the cotter pin and to insert and guide the cotter pin into the relatively small hole 17 in the sleeve 15, and it may easily happen that the head of the cotter pin is flattened when considerable force is exerted thereupon for bending the arms 27 to enfold the wedge and lock the cotter pin against removal. To provide a suitable indication of the proper starting hole and to overcome the disadvantages mentioned above, a semicircular slot 41, shown in full lines in Figs. 11 and 12 and indicated in dotted lines in Figs. 1 and 3, may be made in the sleeve 15 and coextensive with the hole 17 whereby the passage 18 for the cotter pin can be easily located even in the dark. When after the insertion of the cotter pin in the passage a considerable force is exerted upon the head 26 to spread and then fold the arms of the cotter pin and to lock the same completely, the head is guided within the slot 41 and prevented from twisting relative to the arms 27 or from being flattened.

While I have disclosed what I deem to be practical and efficient embodiments of the present invention, it will be obvious that various other modifications may be made without departing from the spirit and scope of the present invention.

Having thus described the invention, what is claimed as new is:

1. In a cotter pin locking device the combination of a body having an entrance passage; a cotter member having a pair of arms; a set of diverging walls for spreading the arms of the cotter; and a set of converging walls for folding said arms toward each other.

2. In a cotter pin locking device the combination of a sleevelike member having a main passage; a body for receiving said sleeve and having a hole coaxial with the main passage; a cotter member having a pair of arms; a set of diverging walls for spreading the arms of the cotter; and a set of converging walls for folding the arms toward each other.

3. In a cotter pin locking device the combination of a body having a main passage; and a pair of coaxial oppositely extending and substantially frusto-conical bores; a cotter member having a pair of arms; a wedge-shaped section in at least one of said frusto-conical bores for spreading the arms of the cotter member, and converging walls in the other bore folding the arms toward each other.

4. In a cotter pin locking device the combination of a body having a passage; a cotter member having a plurality of parallel and closely adjacent arms; means in said body for spreading and maintaining sections of each of said normally parallel arms in a direction away from each other; and means for folding and maintaining the end sections of said arms toward each other.

5. In a cotter pin locking device the combination of a body having a passage; a cotter member having a plurality of parallel and closely adjacent arms, said passage having an entrance opening into which both arms of the cotter member are received; means in said body for spreading sections of each of said normally parallel arms in a direction away from each other after their reception; and means for folding the end sections of said arms toward and into engagement with each other.

6. In a cotter pin locking device the combination of a body having a hole in one side; a pair of semicircular bores each of angular extent in the opposite side of said body equally spaced from the axis of said hole and extending into the same; a wedge-shaped portion coaxial with said hole intermediate said angular bores, a cotter pin having arms passing into said hole and spread apart by said wedge-shaped portion so as to pass into said bores in angular direction relative to each other and be then directed toward each other by the angular walls of said bores to provide a double bend in each of said arms.

7. In a cotter pin locking device the combination of a body having a hole in one side, a substantially frusto-conical bore in the opposite side merging into said hole and having its smaller end at the outer surface of said body; a wedge-shaped element on said body and within said bore; a cotter pin having arms extending into said hole and bore, spread apart by said wedge-shaped element, and then bent toward each other by the walls of said bore.

8. In a cotter pin locking device the combination of a sleeve having a hole in one side and a substantially frusto-conical bore in the opposite side coaxial with said hole and having its smaller end toward the outer surface of said sleeve; a wedge-shaped element on said sleeve and within said bore; a cotter pin having arms extending into said hole and bore, spread apart by said wedge-shaped element, and then bent toward each other by the walls of said bore.

9. In a cotter pin locking device the combination of a sleeve having a hole in one side and a substantially frusto-conical bore in the opposite side; a body surrounded by said sleeve and having a hole coaxial with the hole and bore in said sleeve; a wedge-shaped element on said sleeve and within the bore; a cotter pin having arms extending into said holes and bore, spread apart by said wedge-shaped element, and then bent toward each other by the walls of said bore.

10. In a cotter pin locking device the combination of a body having a hole in one side, and an elongated slot in the other side having end walls; each of said end walls being of angular extent and angularly inclined toward each other; a wedge-shaped element on said body and within said slot; a cotter pin having arms extending into said hole and slot, spread apart by said wedge-shaped elements, and then bent toward each other by the end walls of said slot.

11. In a cotter pin locking device the combination of a cotter member having a plurality of arms; a body having a passage, said passage having an entrance opening into which both arms of the cotter member are received; an element extending transversely relative to said passage for spreading the arms of the cotter member after their reception; and means fixedly mounted relative to said element for then folding the arms of the cotter so that they substantially envelop said element.

GEORGE T. COOKE.